US008065179B1

(12) United States Patent
Karnik

(10) Patent No.: US 8,065,179 B1
(45) Date of Patent: Nov. 22, 2011

(54) METHOD AND APPARATUS FOR PROVIDING A UTILITY-BASED MODEL FOR SECURITY SOFTWARE REVENUE GENERATION

(75) Inventor: Neeran Mohan Karnik, Pune (IN)

(73) Assignee: Symantec Corporation, Mountain View, CA (US)

(*) Notice: Subject to any disclaimer, the term of this patent is extended or adjusted under 35 U.S.C. 154(b) by 525 days.

(21) Appl. No.: 12/210,243

(22) Filed: Sep. 15, 2008

(51) Int. Cl.
*G06Q 10/00* (2006.01)

(52) U.S. Cl. .................................................. 705/7.35

(58) Field of Classification Search ...................... None
See application file for complete search history.

(56) References Cited

U.S. PATENT DOCUMENTS

2006/0282388 A1* 12/2006 Solomon et al. ................ 705/52
2009/0248577 A1* 10/2009 Hoj ................................ 705/40

OTHER PUBLICATIONS

"New McAfee Package to Ship Through Software Resource Sep. 2, 1992", Newsbytes, Sep. 2, 1992.*
Stavrou, Angelos et al., "A Pay-per-Use DoS Protection Mechanism for the Web," downloaded from web site http://www1.cs.columbia.edu/~angelos/Papers/sosmp.pdf on Oct. 17, 2008.

* cited by examiner

*Primary Examiner* — Rutao Wu
(74) *Attorney, Agent, or Firm* — Wilmer Cutler Pickering Hale and Dorr LLP

(57) ABSTRACT

A method and apparatus for providing a utility based revenue stream for a security software subscription at a client computer is provided. In one embodiment, the method for providing a utility based revenue stream for a security software subscription at a client computer comprises analyzing a security activity log based on a utility metric to produce an analysis result and determining a value for the security software subscription based on the analysis result.

20 Claims, 3 Drawing Sheets

METHOD AND APPARATUS FOR PROVIDING A UTILITY-BASED MODEL FOR SECURITY SOFTWARE REVENUE GENERATION

BACKGROUND

1. Field of the Invention

Embodiments of the present invention generally relate to security software, and, more particularly, to a method and apparatus for providing a utility-based model for generating revenue from security software usage.

2. Description of the Related Art

Computing devices use various forms of security software to defend against network-based threats, such as viruses, SPAM, phishing attacks and/or the like. Traditional revenue systems for such security software involve a subscription plan in which a user installs the security software after paying upfront one time license fee. Till the time the security software license is valid, the user receives updates for both, the security software and threat signatures newly identified.

One problem with the conventional revenue systems is that, the fee paid by the user in the subscription plan does not take into account the usage of the security software. In other words, the amount charged to the user for the subscription does not reflect the actual utility or worth of the security software for the user. For example, the user pays the same amount if the security software removed one or hundred viruses.

Moreover, when the license expires, the security software continues to work. Hundreds and thousands of older threat signatures are stored on the user's machine, which are recognized and removed by the old version of the security software. Only latest updates for the security software and threat signatures are not made available to the user. As a result, some users believe that the installed product with its older definitions is good enough and do not see the need to continue paying a subscription fee.

Therefore, there is a need in the art for a method and apparatus for providing a utility-based revenue stream for security software usage at client computer.

SUMMARY OF THE INVENTION

Embodiments of the present invention comprise a method and apparatus for providing a utility based revenue stream for a security software subscription. In one embodiment, a method for providing a utility based revenue stream for a security software subscription at a client computer, comprising analyzing a security activity log based on a utility metric to produce an analysis result and determining a value for the security software subscription based on the analysis result.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
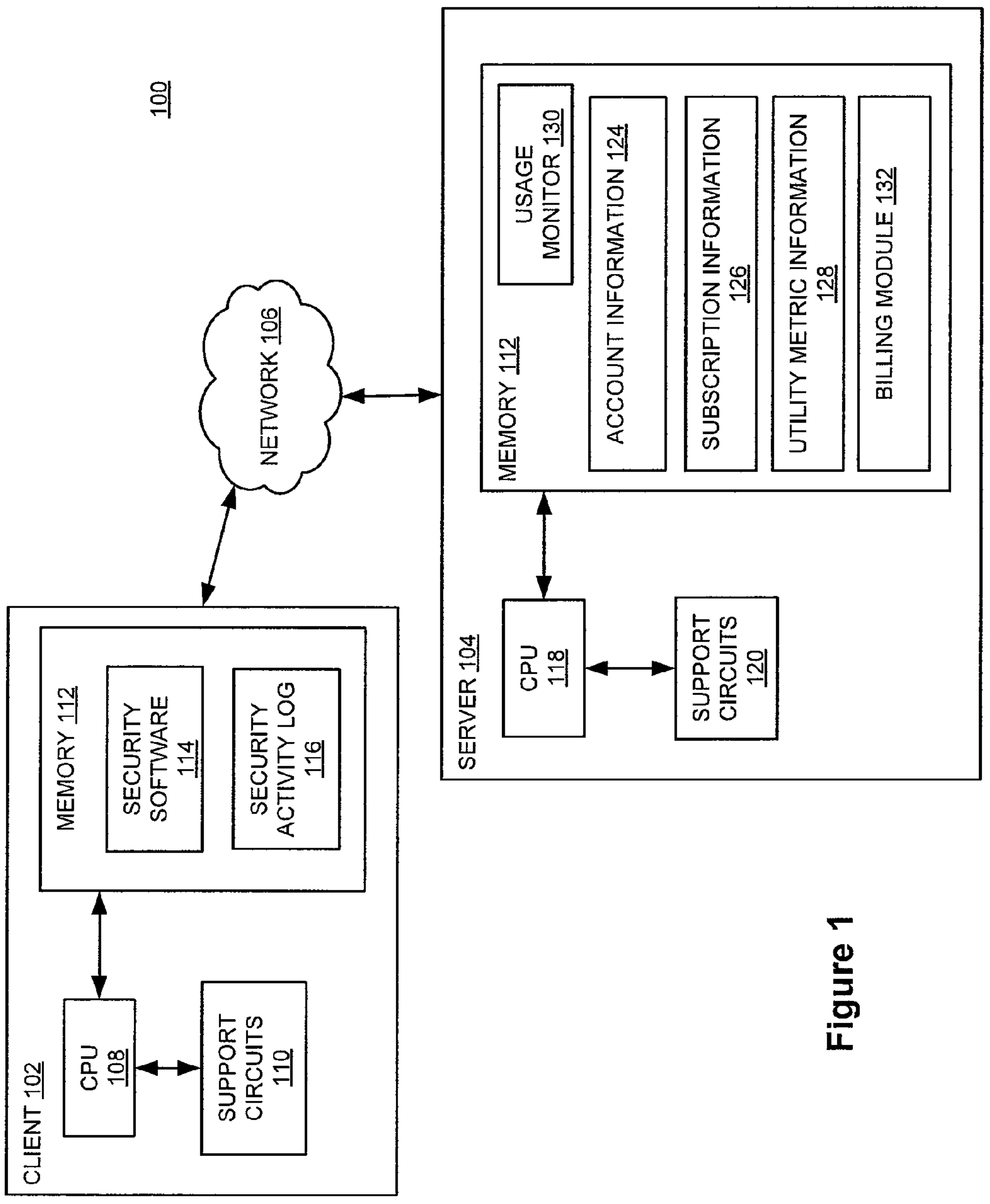
FIG. 1 is a block diagram of a system for providing a utility-based revenue stream for security software usage at client computer in accordance with one or more embodiments of the present invention.

FIG. 1 is a block diagram of a system 100 for providing a utility-based revenue stream for a security software subscription. The system 100 comprises a client 102 and a server 104 that are operatively coupled to each other through a network 106.

The client 102 is a type of computing device (e.g., a laptop, a desktop, a Personal Digital Assistant (PDA), a mobile phone and/or the like), such as those generally known in the art. The client 102 includes a Central Processing Unit (CPU) 108, various support circuits 110, and a memory 112. The CPU 108 may comprise one or more commercially available microprocessors or microcontrollers that facilitate data processing and storage. The support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage, and the like. The memory 112 further includes various software packages, such as security software 114. The memory 112 further includes various data, such as a security activity log 116.

Similarly, the server 104 is a type of computing device (e.g., a laptop, a desktop, a Personal Digital Assistant (PDA), a mobile phone and/or the like) that includes a Central Processing Unit (CPU) 118, various support circuits 120, and a memory 122. The memory 122 further includes various software packages, such as a usage monitor 130 and a billing module 132. The memory 112 further includes various data, such as account information 124, subscription information 126 and utility metric information 128.

The network 106 comprises a communication system that connects a computer system by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the internet or intranet using various communications infrastructure such as Ethernet, WiFi, WiMax, General Packet Radio Service (GPRS), and the like.

The subscription information 126 stores various subscription plan details associated with the security software 114 that is installed on the client 102. The various subscription plan details may include a validity period (e.g., a month, a year and/or the like), fees for various security features (e.g., SPAM filtering, phish filtering, anti-virus protection and/or the like), a payment mode (e.g., pre-paid, post-paid, a one-time subscription fee and/or the like) as well as any other security related specifications.

The security software 114 installed on the client 102 may include anti-virus, anti-spam, anti-phishing, anti-spyware, firewall protection or any other security software package that protects the client 102 from threats. For example, Norton Anti-Virus 11.0 for Mac from SYMANTEC, which uses anti-virus and internet worm protection technologies to deliver protection against malware and runs natively on Intel® and PowerPC®, based Mac® systems. The security software 114 may provide a more comprehensive protection, for example, Norton 360 Version 2 from SYMANTEC, which provides anti-virus, anti-spyware, email scanning, anti-phishing, firewall protection, web-site authentication, rootkit detection, network monitoring and identity protection among other technologies to safeguard against a broad range of online threats.

The security software 114 may also use various techniques (e.g., behavior-blocking, machine learning and/or heuristics) to identify malware and secure the client 102. For example, Norton Anti-Bot from SYMANTEC uses anti-bot technology and active behavioral-based analysis for providing protection. Norton AntiBot provides real-time protection against web robot (bot) attacks, blocks bots from hijacking the computer, stops identity theft by bots, blocks botnets, detects unusual behavior on the computer and eliminates threat and detects malicious software at the deepest levels of the system on which it is installed.

In general, the security activity log 116 records each and every action taken by the security software 114 at the client 102. For example, the security activity log 116 may maintain a number of filtered SPAM, a number of prevented malware threats, a number of blocked intrusions, a number of detected Phish and/or the like. According to one embodiment, a security software action stored in the security log 116 may be determined to be a legitimate action, a false positive or a false negative as explained further below. As such, while the security log 116 may indicate a number of legitimate actions, the security log 116 may also indicate a number of false positives and/or a number of false negatives.

A legitimate action, as described herein, includes a security software action where the security software detects and/or prevents an actual security threat (e.g., a legitimate virus, worm, SPAM and/or intrusion). For example, a legitimate action may be detecting and/or removing a virus, filtering a SPAM email, detecting and/or blocking an intrusion, and/or detecting a phishing attempt and warning a user to not access the website.

A false positive as described herein includes a security software action performed by the security software 114 where the perceived security threat is actually a legitimate operation or program. For example, a false positive may occur when the security software 114 detects a virus that is actually non-malicious software code or filters a bona-fide, legitimate email as SPAM. In one embodiment, if the user discovers a bona-fide email in their SPAM folder and marks the email as Not SPAM', a false negative is recorded in the security activity log 116.

A false negative as described herein refers an instance in which the security software 114 failed to recognize the security threat and/or missed an opportunity to mitigate the security threat. For example, a false negative occurs when the security software 114 permits SPAM to pass the SPAM filter without detection. In one embodiment, if the user discovers the SPAM in the inbox and marks the email as 'SPAM', a false negative is recorded in the security activity log 116. In another embodiment, if it is determined that the security software 114 failed to detect a virus, a false negative is recorded in the security activity log 116.

The utility metric information 128 includes utility-based values for various actions associated with the security software 114. In one embodiment, the utility metric information 128 indicates a fee for each legitimate action performed. The fee for each legitimate action is directly related to the security threat posed to the client 102. For example, the utility metric information 128 may indicate a fee of one dollar for removing a virus because viruses have the potential to cause a lot of damage, whereas, the utility metric information 128 may indicate a fee of one cent for filtering a SPAM email because SPAM is not as harmful as the virus.

In another embodiment, the utility metric information 128 indicates a refund for each false positive and/or each false negative. For example where a non-malicious code is falsely indicated as a virus, the utility metric information 128 indicates a refund of one dollar. Similarly, the utility metric information 128 indicates a refund of one cent when a bona-fide email filtered as SPAM. In yet another example, the utility metric information 128 may indicate a refund of twenty dollars for each undetected virus or a refund of twenty cents for each SPAM email which passes through the SPAM filter undetected. In some embodiments, the utility metric information 128 may further indicate compensation for the inconvenience caused to the user in addition to the refund for each false positive. For example, the utility metric information 128 may indicate compensation of fifty cents for each false positive and/or each false positive.

In one embodiment, a limit is imposed on the compensation, where the user defines the false negative and false positive. Only a predetermined number of false positives and false negatives are compensated. The predetermined number of false positives and false negatives, which are compensated for may be set using any suitable method like, for example the probability of such an event occurring. A limited compensation prevents cheating by customers, for example, by marking bona-fide email as SPAM to gain benefits indicated for false negatives and vice-versa (i.e. by marking SPAM email as bona-fide to gain benefits indicated for false positives). For example, the number of false negatives and false positives which are compensated may be set to a maximum of five dollars and ten dollars respectively.

The usage monitor 130 analyzes the actions taken by the security software 114 at the client 102. The usage monitor 130 determines a value for the security software subscription based on actual usage by computing the value of each action (including legitimate actions, false positives and false negatives) logged in the security activity log 116 using their corresponding fee or refund indicated by the utility metric information 128. For example, the value of the security software subscription may simply be the total refund for the false positives and false negatives (i.e., including any compensation for inconvenience) subtracted from the total fee for the legitimate actions performed by the security software 114. In one embodiment, the usage monitor 130 generates an analysis result in the form of a report that simply lists all the fees and refunds and/or compensations along with the corresponding actions.

The periodicity with which the usage monitor 130 generates the analysis result and the value of security software subscription may be customized. In one embodiment, the usage monitor 130 may have a time-dependent periodicity. For example, the periodicity may be in real-time where the value of security software subscription is updated with each action. The periodicity may be monthly in which the value of security software subscription is updated every month. In another embodiment, the usage monitor 130 may have a number-dependent periodicity. For example, the usage monitor 130 may generate a value of security software subscription, when the security activity log has a predetermined number of actions logged. In another embodiment, a value of security software subscription may be generated on demand.

The billing module 132 processes the value for the security software subscription and updates the account information 124 associated with the client 102. In one embodiment, the billing module 132 debits any fees for the security software subscription and/or credits any refunds for the security software subscription into the account information 124. The account information 124 maintains the account balance for the security software subscription at the client 102 depending on the mode of payment indicated in the software subscription information 126. In one embodiment, the account information 124 reflects the remaining account balance after the billing module 132 credits the refunds or debits the fees from a pre-paid amount. The user however could recharge the account balance and increase the pre-paid amount any time and the same would be reflected in the account information 124. In another embodiment, the account information 124 reflects the account balance due to be paid by the user.

Further, the billing module 132 communicates the updated account information 124 to the user periodically (for e.g., monthly, weekly or annually) or when the pre-paid amount finishes and the account needs to be renewed. In one embodiment, the security software 114 could disable itself if the payment is not made within a stipulated period (e.g., within 5 working days of communicating the account information 124 to the user). In another embodiment, the account information 124 may also store some customer information, such as, for example, credit card details or bank account details for direct payments through credit cards or bank account transfers respectively.

Figure 2:
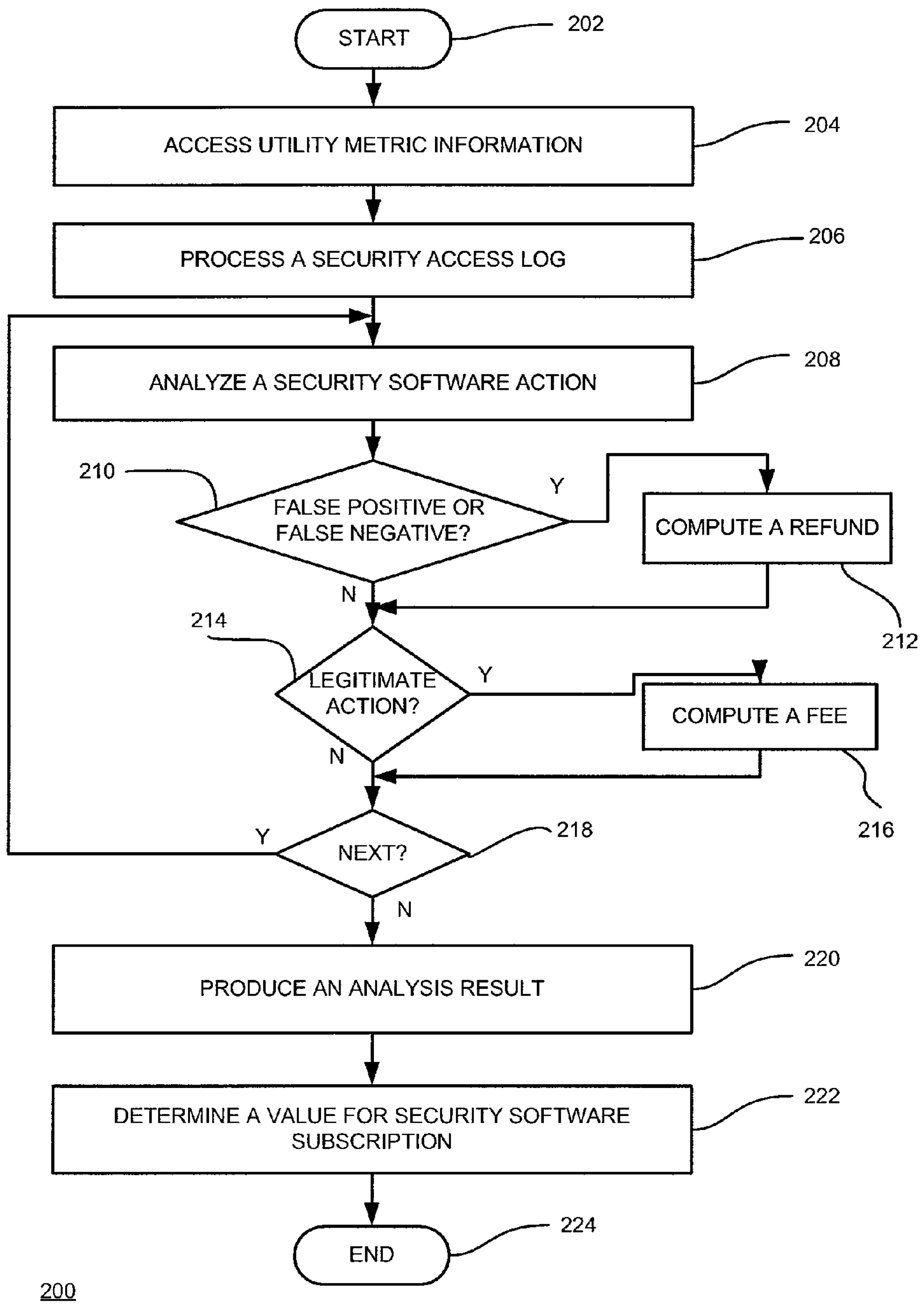
FIG. 2 is a flow diagram of a method for computing a value for a security software subscription in accordance with one or more embodiments of the present invention.

FIG. 2 is a flow diagram of a method 200 for computing a value for a security software subscription according to one embodiment. The method 200 starts at step 202 and proceeds to step 204, at which the usage monitor (e.g., the usage monitor 130 of FIG. 1) accesses the utility metric information (e.g., the utility metric information 128 of FIG. 1). At step 206 a security activity log (i.e. the security activity log 116 of FIG. 1) is processed. At step 208, each logged security software action is analyzed.

At step 210, a determination is made as to whether the action performed by the security software at the client computer is a false positive or a false negative. If it is determined that the action is a false negative or a false positive (option "YES"), then the method 200 proceeds to step 212, at which a refund is computed based on the refund indicated in the utility metric information 128 for the corresponding action. If it is determined that the action is neither a false negative nor a false positive (option "NO"), then the method 200 proceeds to step 214, at which a determination is made as to whether the action is a legitimate action. If it is determined that the action is legitimate (option "YES"), the method 200 proceeds to step 216, at which a fee is computed based on a fee that corresponds with the action as indicated in the utility metric information. If it is determined that the action is not a legitimate action (option "NO"), the method 200 proceeds to step 218.

At step 218, a determination is made as to whether another logged security software action is to be analyzed. If it is determined that the next security software action, which needs to be analyzed exists, the method 200 proceeds to step 208. If it is determined that the next security software action does not exist, then the method 200 proceeds to step 220, at which an analysis result is generated. At step 222, a value for security software subscription is determined based on the fee and refunds in the analysis result. For example, the value for security software subscription may simply be the total refunds subtracted from the total fee charged. At step 224, the method 200 ends.

Figure 3:
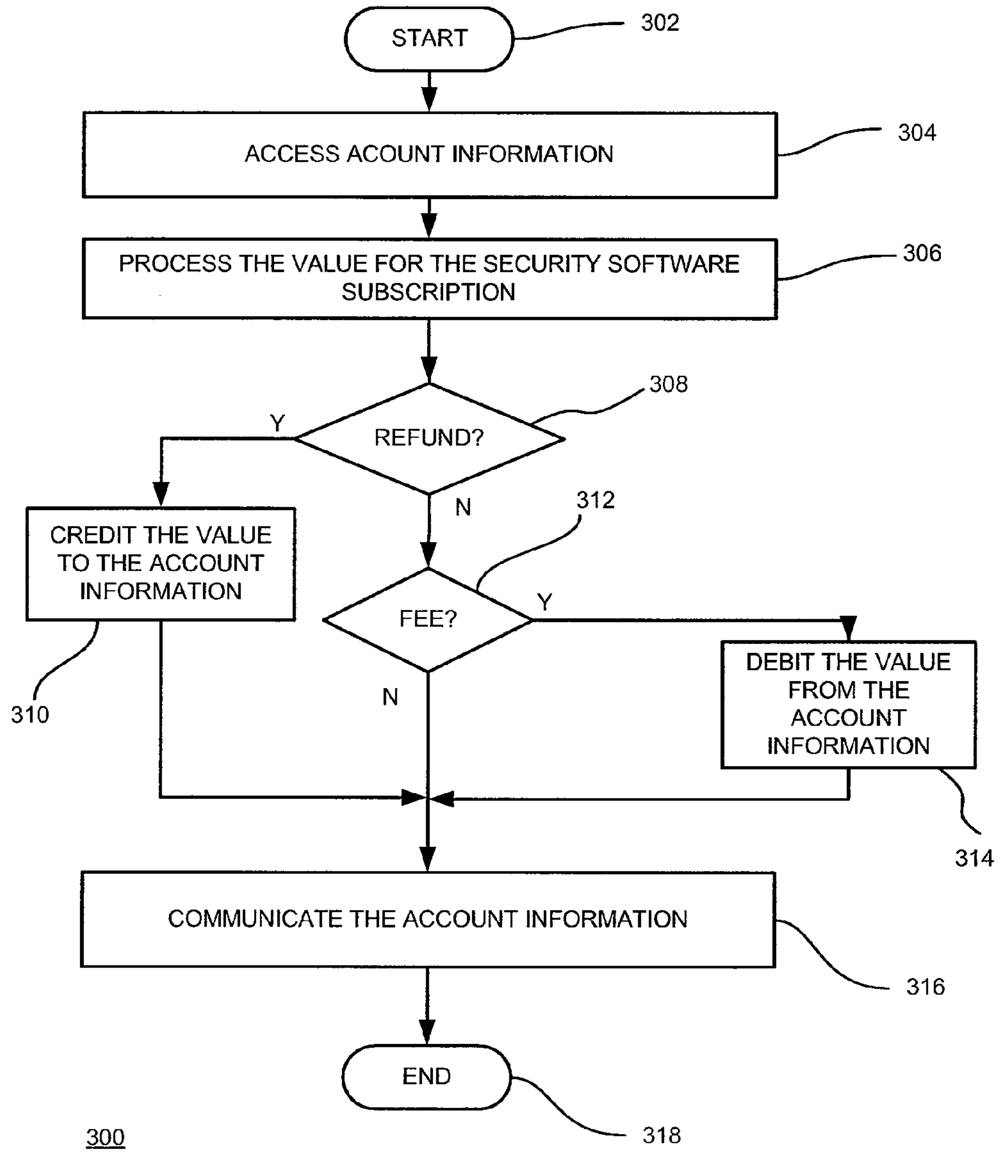
FIG. 3 is a flow diagram of a method for managing an account for a security software subscription in accordance with one or more embodiments of the present invention.

FIG. 3 is a flow diagram of a method 300 for managing account information for a security software subscription according to one embodiment. The method 300 starts at step 302 and proceeds to step 304, at which the account information (e.g., the account information 124 in FIG. 1) associated with the security software (e.g., the security software 114) is accessed.

At step 306, a value for the security software subscription is processed. At step 308, a determination is made as to whether the value for security software subscription is a refund. If it is determined that the security software subscription is a refund (option "YES"), then the method 300 proceeds to step 310, at which the refund amount is credited to the account information. If it is determined that the security software subscription is not a refund (option "NO"), then the method proceeds to step 312. At step 312, a determination is made as to whether the value for security software subscription is a fee. If it is determined that the security software subscription is a fee (option "YES"), then the method 300 proceeds to step 314, at which the fee amount is debited from the account information. If it is determined that the security software subscription is not a fee (option "NO"), then the method 300 proceeds to step 316, at which the account information is communicated to the user. At step 318, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for providing a utility-based revenue stream for a security software subscription at a client computer, comprising:

accessing a security activity log comprising a plurality of security actions, wherein each of the plurality of security actions comprise one of a legitimate action, a false-positive action, and a false-negative action;

analyzing the plurality of security actions in the security activity log based on a utility metric to produce an analysis result; and determining a value for the security software subscription based on the analysis result, wherein the value is changed by a first amount for each legitimate action, changed by a second amount for each false-positive action, and changed by a third amount for each false-negative action, wherein the first amount is determined based on an importance of security threat associated with the corresponding legitimate action, and wherein the first amount is distinct from the second and third amount.

2. The method of claim 1, wherein the security software activity log comprises at least one of a number of prevented malware threats prevented, a number of blocked intrusions, a number of filtered SPAM or a number of detected Phish.

3. The method of claim 2, wherein analyzing the security activity log further comprises computing a fee based on the utility metric for the at least one of a number of prevented malware threats prevented, a number of blocked intrusions, a number of filtered SPAM or a number of detected Phish.

4. The method of claim 3 further comprising debiting the fee from account information associated with the client computer.

5. The method of claim 1 further comprising applying the value to account information associated with the client computer.

6. The method of claim 1, wherein the security software activity log comprises at least one of a number of false positives or a number of false negatives.

7. The method of claim 6, wherein analyzing the security activity log further comprises computing a refund based on the utility metric in response to the at least one of a number of false positives or a number of false negatives.

8. The method of claim 7 further comprising crediting the refund to an account associated with the client computer.

9. The method of claim 1, determining the value for the security software subscription further comprises subtracting a total refund from a total fee to compute the value for the security software subscription.

10. An apparatus for providing a utility-based revenue stream for a security software subscription at a client computer, comprising:

a memory comprising utility metric information; and a usage monitor for accessing a security activity log comprising a plurality of security actions, wherein each of the plurality of security actions comprise one of a legitimate action, a false-positive action, and a false-negative action; and processing the security activity log based on a utility metric to determine a value for the security software subscription, wherein the value is changed by a first amount for each legitimate action, changed by a second amount for each false-positive action, and changed by a third amount for each false-negative action, wherein the first amount is determined based on an importance of security threat associated with the corresponding legitimate action, and wherein the first amount is distinct from the second and third amount.

11. The apparatus of claim 10, wherein the usage monitor computes a fee based on the utility metric information for at least one of a number of prevented malware threats prevented, a number of blocked intrusions, a number of filtered SPAM or a number of detected Phish.

12. The apparatus of claim 10, wherein the usage monitor computes a refund based on the utility metric information for at least one of a number of false positives or a number of false negatives.

13. The apparatus of claim 10 further comprising a billing module for updating account information using the value for the security software subscription.

14. The apparatus of claim 13, wherein the billing module performs at least one of debiting a fee from the account information or crediting a refund to the account information.

15. The apparatus of claim 10, wherein the utility metric information indicates at least one value for at least one security software action.

16. A system for providing a utility-based revenue stream for a security software subscription at a client computer, comprising:

a client computer, comprising:

a security activity log generated by the security software, wherein the security activity log comprising a plurality of security actions, wherein each of the plurality of security actions comprise one of a legitimate action, a false-positive action, and a false-negative action; and a server computer, comprising:

a usage monitor processing the security activity log based on a utility metric to determine a value for the security software subscription, wherein the value is changed by a first amount for each legitimate action, changed by a second amount for each false-positive action, and changed by a third amount for each false-negative action, and wherein the first amount is determined based on an importance of security threat associated with the corresponding legitimate action, and wherein the first amount is distinct from the second and third amount.

17. The system of claim 16, wherein the utility metric information indicates at least one fee for at least one legitimate action performed and at least one refund for at least one false positive and at least one false negative.

18. The system of claim 16 further comprising a billing module for applying the value for the security software subscription to account information associated with the client computer.

19. The system of claim 16, wherein the usage monitor computes a fee based on the utility metric information for at least one of a number of prevented malware threats prevented, a number of blocked intrusions, a number of filtered SPAM or a number of detected Phish.

20. The system of claim 16, wherein the usage monitor computes a refund based on the utility metric information for at least one of a number of false positives or a number of false negatives.

* * * * *